(12) United States Patent
Kim et al.

(10) Patent No.: US 10,936,098 B2
(45) Date of Patent: Mar. 2, 2021

(54) DISPLAY APPARATUS WITH INTEGRATED TOUCH SCREEN

(71) Applicant: LG Display Co., Ltd., Seoul (KR)

(72) Inventors: Tae-Kyung Kim, Paju-si (KR); KwangSu Lim, Paju-si (KR); HyoSeon Kim, Paju-si (KR); Sangheun Lee, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 16/216,726

(22) Filed: Dec. 11, 2018

(65) Prior Publication Data

US 2019/0187850 A1 Jun. 20, 2019

(30) Foreign Application Priority Data

Dec. 14, 2017 (KR) .................. 10-2017-0171807

(51) Int. Cl.
*G06F 3/041* (2006.01)
*G06F 3/042* (2006.01)
*G06F 1/16* (2006.01)
*G06F 3/044* (2006.01)

(52) U.S. Cl.
CPC .......... *G06F 3/0412* (2013.01); *G06F 1/1643* (2013.01); *G06F 3/042* (2013.01); *G06F 3/0443* (2019.05); *G06F 3/0446* (2019.05); *G06F 3/04166* (2019.05); *G06F 2203/04111* (2013.01)

(58) Field of Classification Search
CPC ............................................ G06F 2203/04111
See application file for complete search history.

(56) References Cited

U.S. PATENT DOCUMENTS

| 2009/0085885 | A1* | 4/2009 | Wu | G06F 3/041 |
| | | | | 345/173 |
| 2010/0171718 | A1 | 7/2010 | Denda | |
| 2013/0241857 | A1 | 9/2013 | Chung et al. | |
| 2015/0169105 | A1* | 6/2015 | Tung | G06F 3/044 |
| | | | | 345/174 |
| 2015/0169109 | A1 | 6/2015 | Park | |
| 2018/0233541 | A1* | 8/2018 | Zeng | H01L 51/5246 |

* cited by examiner

*Primary Examiner* — Robin J Mishler
(74) *Attorney, Agent, or Firm* — Seed IP Law Group LLP (57) ABSTRACT

Disclosed is a display apparatus with integrated touch screen, which prevents short circuit from occurring between bridge electrodes and first and second touch electrodes. The display apparatus includes a light emitting device layer disposed on a first substrate, an encapsulation layer disposed on the light emitting device layer, and a touch sensing layer disposed on the light emitting device layer, the touch sensing layer including a plurality of first touch electrodes, a plurality of second touch electrodes, a plurality of bridge electrodes, and a step height cover layer covering a step height caused by at least one of the plurality of first touch electrodes, the plurality of second touch electrodes, and the plurality of bridge electrodes.

12 Claims, 9 Drawing Sheets

DISPLAY APPARATUS WITH INTEGRATED TOUCH SCREEN

CROSS-REFERENCE TO RELATED APPLICATIONS

This application claims the benefit of the Korean Patent Application No. 10-2017-0171807 filed on Dec. 14, 2017, which is hereby incorporated by reference as if fully set forth herein.

BACKGROUND

Technical Field

The present disclosure relates to a display apparatus with integrated touch screen.

Description of the Related Art

With the advancement of information-oriented society, various requirements for display apparatuses for displaying an image are increasing. Therefore, various display apparatuses such as liquid crystal display (LCD) apparatuses, plasma display panels (PDPs), and organic light emitting display apparatuses are being used recently. In such display apparatuses, the organic light emitting display apparatuses are driven with low voltages and have characteristics such as thinness, wide viewing angle, fast response time, etc.

The organic light emitting display apparatuses each include a display panel which includes a plurality of data lines, a plurality of scan lines, and a plurality of pixels respectively provided in a plurality of pixel areas adjacent to the overlapping locations of the data lines and the scan lines, a scan driver which respectively supplies scan signals to the scan lines, and a data driver which respectively supplies data voltages to the data lines. Each of the pixels includes an organic light emitting device, a driving transistor which controls the amount of current supplied to the organic light emitting device according to a voltage of a gate electrode, and a scan transistor which supplies a data voltage of a corresponding data line to the gate electrode of the driving transistor in response to a scan signal of a corresponding scan line.

Recently, the organic light emitting display apparatuses are implemented as a display apparatus with integrated touch screen including a touch screen panel capable of sensing a touch of a user. In this case, the organic light emitting display apparatuses function as a touch screen device. Recently, a touch screen device is applied to monitors such as navigations, industrial terminals, notebook computers, financial automation equipment, and game machines, portable terminals such as portable phones, MP3 players, PDAs, PMPs, PSPs, portable game machines, DMB receivers, and tablet personal computers (PCs), and home appliances such as refrigerators, microwave ovens, and washing machines and the like. Since all users can easily manipulate the touch screen device, the application of the touch screen device is being progressively expanded.

In display apparatuses with integrated touch screen, first touch electrodes, second touch electrodes, bridge electrodes for connecting the first touch electrodes or the second touch electrodes are provided in a display panel. The first touch electrodes may be Tx electrodes, and the second touch electrodes may be Rx electrodes.

An insulation layer may be provided between the first touch electrodes, the second touch electrodes, and the bridge electrodes. For example, the insulation layer may be provided on the bridge electrodes, and the first touch electrodes and the second touch electrodes may be provided on the insulation layer. The insulation layer may be provided on a step height caused by the bridge electrodes. In this case, a void occurs due to the step height caused by the bridge electrodes. For this reason, the display apparatuses with integrated touch screen cannot sense a user touch due to short circuit between the bridge electrodes and the first and second touch electrodes.

BRIEF SUMMARY

Accordingly, the present disclosure is directed to provide a display apparatus with integrated touch screen that substantially obviates one or more problems due to limitations and disadvantages of the related art.

One aspect of the present disclosure is directed to provide a display apparatus with integrated touch screen, which prevents short circuit from occurring between bridge electrodes and first and second touch electrodes.

Another aspect of the present disclosure is directed to provide a display apparatus with integrated touch screen that improves user experience in using touch screen devices by preventing short circuits from occurring between electrodes.

Additional advantages and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these and other advantages and in accordance with the purpose of the disclosure, as embodied and broadly described herein, there is provided a display apparatus with integrated touch screen, the display apparatus including a light emitting device layer disposed on a first substrate, an encapsulation layer disposed on the light emitting device layer, and a touch sensing layer disposed on the light emitting device layer, the touch sensing layer including a plurality of first touch electrodes, a plurality of second touch electrodes, a plurality of bridge electrodes, and a step height cover layer covering a step height caused by at least one of the plurality of first touch electrodes, the plurality of second touch electrodes, and the plurality of bridge electrodes.

It is to be understood that both the foregoing general description and the following detailed description of the present disclosure are exemplary and explanatory and are intended to provide further explanation of the disclosure as claimed.

BRIEF DESCRIPTION OF THE SEVERAL VIEWS OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

DETAILED DESCRIPTION

Reference will now be made in detail to the exemplary embodiments of the present disclosure, examples of which are illustrated in the accompanying drawings. Wherever possible, the same reference numbers will be used throughout the drawings to refer to the same or like parts.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Further, the present disclosure is only defined by scopes of claims.

A shape, a size, a ratio, an angle, and a number disclosed in the drawings for describing embodiments of the present disclosure are merely an example, and thus, the present disclosure is not limited to the illustrated details. Like reference numerals refer to like elements throughout. In the following description, when the detailed description of the relevant known function or configuration is determined to unnecessarily obscure the important point of the present disclosure, the detailed description will be omitted.

In a case where 'comprise', 'have', and 'include' described in the present specification are used, another part may be added unless 'only~' is used. The terms of a singular form may include plural forms unless referred to the contrary.

In construing an element, the element is construed as including an error range although there is no explicit description.

In describing a position relationship, for example, when a position relation between two parts is described as 'on~', 'over~', 'under~', and 'next~', one or more other parts may be disposed between the two parts unless 'just' or 'direct' is used.

In describing a time relationship, for example, when the temporal order is described as 'after~', 'subsequent~', 'next~', and 'before~', a case which is not continuous may be included unless 'just' or 'direct' is used.

It will be understood that, although the terms "first", "second", etc., may be used herein to describe various elements, these elements should not be limited by these terms. These terms are only used to distinguish one element from another. For example, a first element could be termed a second element, and, similarly, a second element could be termed a first element, without departing from the scope of the present disclosure.

An X axis direction, a Y axis direction, and a Z axis direction should not be construed as only a geometric relationship where a relationship therebetween is vertical, and may denote having a broader directionality within a scope where elements of the present disclosure operate functionally.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

Features of various embodiments of the present disclosure may be partially or overall coupled to or combined with each other, and may be variously inter-operated with each other and driven technically as those skilled in the art can sufficiently understand. The embodiments of the present disclosure may be carried out independently from each other, or may be carried out together in co-dependent relationship.

Hereinafter, exemplary embodiments of the present disclosure will be described in detail with reference to the accompanying drawings.

Figure 1:
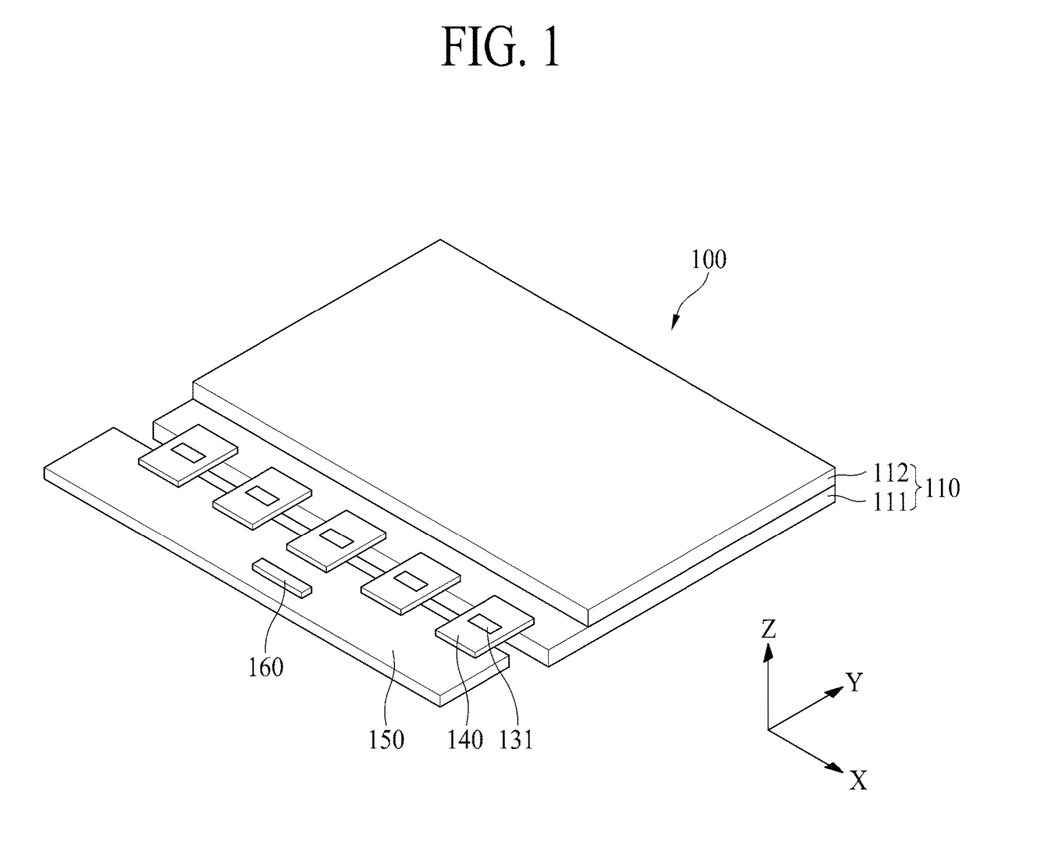
FIG. 1 is a perspective view illustrating a display apparatus with integrated touch screen according to an embodiment of the present disclosure.
Figure 2:
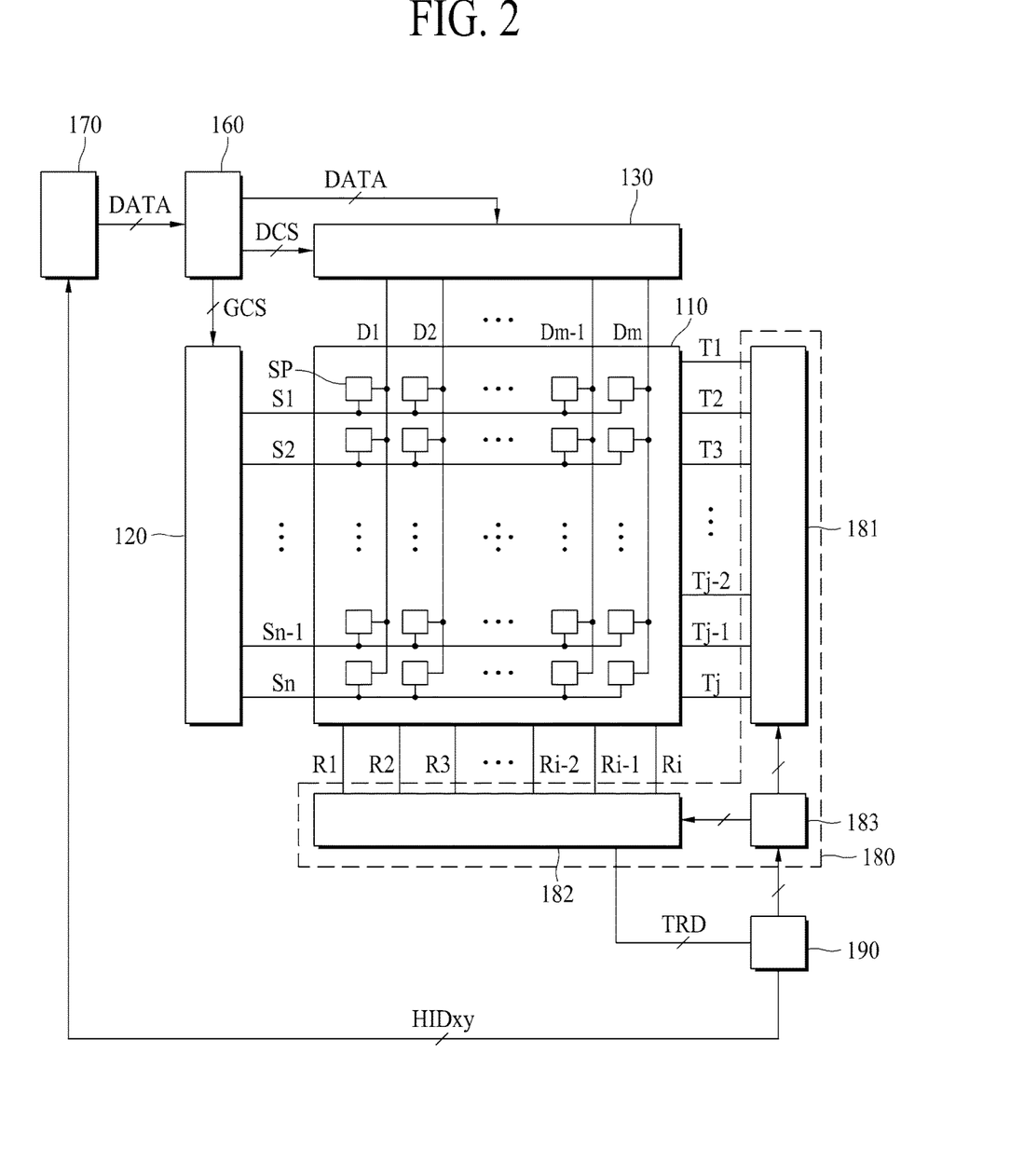
FIG. 2 is a block diagram illustrating a display apparatus with integrated touch screen according to an embodiment of the present disclosure.

FIG. 1 is a perspective view illustrating a display apparatus with integrated touch screen according to an embodiment of the present disclosure. FIG. 2 is a block diagram illustrating a display apparatus with integrated touch screen according to an embodiment of the present disclosure.

Referring to FIGS. 1 and 2, the display apparatus with integrated touch screen 100 according to an embodiment of the present disclosure may include a display panel 110, a scan driver 120, a data driver 130, a timing controller 160, a host system 170, a touch driver 180, and a touch coordinate calculator 190.

The display apparatus with integrated touch screen according to an embodiment of the present disclosure may be implemented with an LCD apparatus, a field emission display (FED) apparatus, a PDP device, an organic light emitting display apparatus, an electrophoresis display (EPD) apparatus, or the like. Hereinafter, an example where the display apparatus with integrated touch screen according to an embodiment of the present disclosure is implemented with an organic light emitting display apparatus will be described, but the present disclosure is not limited thereto.

The display panel 110 may include a first substrate 111 and a second substrate 112. The second substrate 112 may be an encapsulation substrate. The first substrate 111 may be a plastic film, a glass substrate, or the like. The second substrate 112 may be a plastic film, a glass substrate, an encapsulation film (a protective film), or the like.

The display panel 110 may include a display area where a plurality of subpixels SP are provided to display an image. A plurality of data lines D1 to Dm (where m is a positive integer equal to or more than two) and a plurality of scan lines S1 to Sn (where n is a positive integer equal to or more than two) may be provided. The data lines D1 to Dm may be provided to overlap with the scan lines S1 to Sn. The subpixels SP may be respectively provided in a plurality of areas adjacent to the overlapping locations of the data lines D1 to Dm and the scan lines S1 to Sn.

Each of the subpixels SP of the display panel 110 may be connected to one of the data lines D1 to Dm and one of the scan lines S1 to Sn. Each of the subpixels SP of the display panel 110 may include a driving transistor which controls a drain-source current according to a data voltage applied to a gate electrode, a scan transistor which is turned on by a scan signal of a scan line and supplies the data voltage of a data line to the gate electrode of the driving transistor, an organic light emitting diode (OLED) which emits light with the drain-source current of the driving transistor, and a capacitor which stores a voltage at the gate electrode of the driving transistor. Therefore, each of the subpixels SP may emit light with a current supplied to the OLED.

The scan driver 120 may receive a scan control signal GCS from the timing controller 160. The scan driver 120 may supply scan signals to the scan lines S1 to Sn according to the scan control signal GCS.

The scan driver 120 may be provided in a non-display area outside one side or both sides of a display area of the display panel 110 in a gate driver-in panel (GIP) type. Alternatively, the scan driver 120 may be manufactured as a driving chip and may be mounted on a flexible film, and moreover, may be attached on the non-display area outside the one side or the both sides of the display area of the display panel 110 in a tape automated bonding (TAB) type.

The data driver 130 may receive digital video data DATA and a data control signal DCS from the timing controller 160. The data driver 130 may convert the digital video data DATA into analog positive/negative data voltages according to the data control signal DATA and may supply the data voltages to the data lines. That is, subpixels to which the data voltages are to be supplied may be selected by the scan signals of the scan driver 120, and the data voltages may be supplied to the selected subpixels.

The data driver 130 may include a plurality of source drive integrated circuits (ICs) 131. Each of the plurality of source drive ICs 131 may be mounted on a flexible film 140 in a chip-on film (COF) type or a chip-on plastic (COP) type. The flexible film 140 may be attached on a plurality of pads provided in the non-display area of the display panel 110 by using an anisotropic conductive film, and thus, the plurality of source drive ICs 131 may be connected to the pads.

The flexible film 140 may be provided in plurality, and a circuit board 150 may be attached on the flexible films 140. A plurality of circuits respectively implemented as driving chips may be mounted on the circuit board 150. For example, the timing controller 160 may be mounted on the circuit board 150. The circuit board 150 may be a printed circuit board (PCB) or a flexible printed circuit board (FPCB).

The timing controller 160 may receive the digital video data DATA and timing signals from the host system 170. The timing signals may include a vertical synchronization signal, a horizontal synchronization signal, a data enable signal, a dot clock, etc. The vertical synchronization signal may be a signal that defines one frame period. The horizontal synchronization signal may be a signal that defines one horizontal period necessary for supplying data voltages to subpixels of one horizontal line of the display panel 110. The data enable signal may be a signal that defines a period where valid data is input. The dot clock may be a signal that is repeated at a certain short period.

The timing controller 160 may generate the data control signal DCS for controlling an operation timing of the data driver 130 and the scan control signal GCS for controlling an operation timing of the scan driver 120 so as to control the operation timing of each of the scan driver 120 and the data driver 130, based on the timing signals. The timing controller 160 may output the scan control signal GCS to the scan driver 120 and may output the digital video data DATA and the data control signal DCS to the data driver 130.

The host system 170 may be implemented as a navigation system, a set-top box, a DVD player, a blue-ray player, a personal computer (PC), a home theater system, a broadcasting receiver, a phone system, or the like. The host system 170 may include a system-on chip (SoC) with a scaler embedded therein and may convert the digital video data DATA of an input image into a format suitable for displaying the image on the display panel 110. The host system 170 may transmit the digital video data DATA and the timing signals to the timing controller 160.

In addition to the data lines DL1 to DLm and the scan lines SL1 to SLn, a plurality of first and second touch electrodes may be provided in the display panel 110. The first touch electrodes may be provided to overlap the second touch electrodes. The first touch electrodes may be connected to a first touch driver 181 through a plurality of first touch lines T1 to Tj (where j is a positive integer equal to or more than two). The second touch electrodes may be connected to a second touch driver 182 through a plurality of second touch lines R1 to Ri (where i is a positive integer equal to or more than two). A plurality of touch sensors may be respectively provided in intersection portions of the first touch electrodes and the second electrodes. In an embodiment of the present disclosure, each of the touch sensors may be exemplarily implemented with a mutual capacitor, but is not limited thereto. A disposition structure of the first and second touch electrodes will be described below in detail with reference to FIGS. 4 and 5.

The touch driver 180 may supply a driving pulse to the first touch electrodes through the first touch line T1 to Tj and may sense charging variations of the touch sensors through the second touch lines R1 to Ri. That is, in FIG. 2, it is described that the first touch line T1 to Tj are Tx lines through which the driving pulse is supplied, and the second touch lines R1 to Ri are Rx lines through which the charging variations of the touch sensors are respectively sensed.

The touch driver 180 may include a first touch driver 181, a second touch driver 182, and a touch controller 183. The first touch driver 181, the second touch driver 182, and the touch controller 183 may be integrated into one readout integrated chip (ROIC).

The first touch driver 181 may select a first touch line through which the driving pulse is to be output, based on control by the touch controller 183 and may supply the driving pulse to the selected first touch line. For example, the driving pulse may be provided in plurality, and the first touch driver 181 may sequentially supply the driving pulses to the first touch lines T1 to Tj.

The second touch driver 182 may select second touch lines through which charging variations of touch sensors are to be received, based on control by the touch controller 183 and may receive the charging variations of the touch sensors through the selected second touch lines. The second touch driver 182 may sample the charging variations of the touch sensors received through the second touch lines R1 to Ri to convert the charging variations into touch raw data TRD which are digital data.

The touch controller 183 may generate a Tx setup signal for setting a first touch line, to which the driving pulse is to be output from the first touch driver 181, and an Rx setup signal for setting a second touch line through which a touch sensor voltage is to be received from the second touch driver 182. Also, the touch controller 183 may generate timing control signals for controlling the operation timings of the first touch driver 181 and the second touch driver 182.

The touch coordinate calculator 190 may receive the touch raw data TRD from the touch driver 180. The touch coordinate calculator 190 may calculate touch coordinates, based on a touch coordinate calculation method and may output touch coordinate data HIDxy, including information about the touch coordinates, to the host system 170.

The touch coordinate calculator 190 may be implemented with a micro controller unit (MCU). The host system 170 may analyze the touch coordinate data HIDxy input from the touch coordinate calculator 190 to execute an application program associated with coordinates where a touch has been performed by a user. The host system 170 may transmit the digital video data DATA and the timing signals to the timing controller 160 according to the executed application program.

The touch driver 180 may be included in the source drive ICs 131, or may be manufactured as a separate driving chip and mounted on the circuit board 150. Also, the touch coordinate calculator 190 may be manufactured as a separate driving chip and mounted on the circuit board 150.

Figure 3:
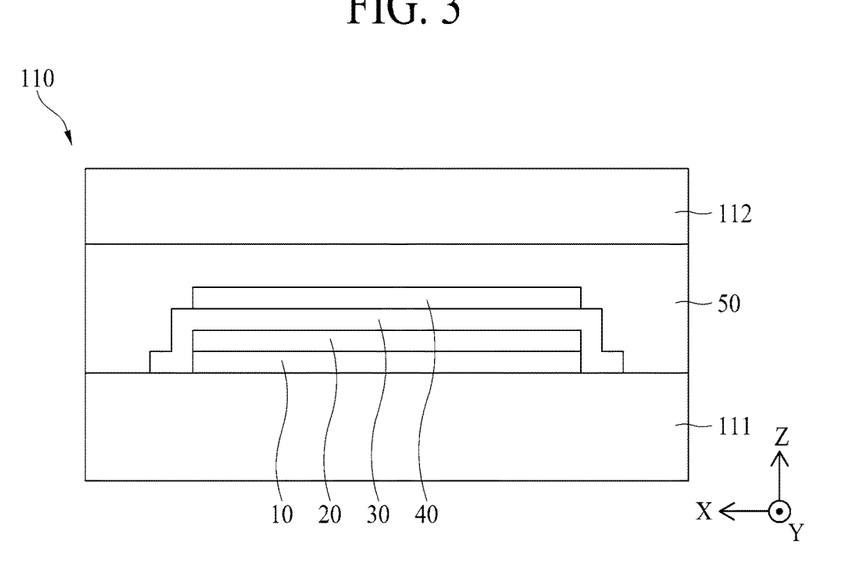
FIG. 3 is a cross-sectional view illustrating one side of a display panel of FIG. 1.

FIG. 3 is a cross-sectional view illustrating one side of the display panel 110 of FIG. 1.

Referring to FIG. 3, the display panel 110 may include a first substrate 111, a second substrate 112, a thin film transistor (TFT) layer 10 disposed between the first and second substrates 111 and 112, a light emitting device layer 20, an encapsulation layer 30, a touch sensing layer 40, and an adhesive layer 50.

The first substrate 111 may be a plastic film, a glass substrate, or the like.

The TFT layer 10 may be formed on the first substrate 111. The TFT layer 10 may include the scan lines, the data lines, and a plurality of TFTs. The TFTs may each include a gate electrode, a semiconductor layer, a source electrode, and a drain electrode. In a case where the scan driver is provided as the GIP type, the scan driver may be formed along with the TFT layers 10. The TFT layer 10 will be described below in detail with reference to FIGS. 6 to 8.

The light emitting device layer 20 may be formed on the TFT layer 10. The light emitting device layer 20 may include a plurality of first electrodes, a light emitting layer, a second electrode, and a plurality of banks. The light emitting layer may include an organic light emitting layer including an organic material. In this case, the light emitting layer may include a hole transporting layer, an organic light emitting layer, and an electron transporting layer. When a voltage is applied to the first electrode and the second electrode, a hole and an electron move to the organic light emitting layer through the hole transporting layer and the electron transporting layer and are combined with each other in the organic light emitting layer to emit light. The light emitting device layer 20 may be a pixel array layer where pixels are provided, and thus, an area where the light emitting device layer 20 is provided may be referred to as a display area. A peripheral area of the display area may be referred to as a non-display area. The light emitting device layer 20 will be described below in detail with reference to FIGS. 6 to 8.

The encapsulation layer 30 may be formed on the light emitting device layer 20. The encapsulation layer 30 prevents oxygen or water from penetrating into the light emitting device layer 20. The encapsulation layer 30 may include at least one inorganic layer and at least one organic layer. A cross-sectional structure of the encapsulation layer 30 will be described below in detail with reference to FIGS. 6 to 8.

The touch sensing layer 40 may be formed on the encapsulation layer 30. The touch sensing layer 40 may include first and second touch electrode layers for sensing a user touch. The first touch electrode layer may include a plurality of first touch electrodes connected to the first touch lines T1 to Tj and a plurality of second touch electrodes connected to the second touch lines R1 to Ri. The second touch electrode layer may include a plurality of bridge electrodes which connect the first touch electrodes or the second touch electrodes. In an embodiment of the present disclosure, since the touch sensing layer 40 for sensing a user touch is formed on the encapsulation layer 30, it is not required that a touch screen device is separately attached on a display device. A plane structure of the touch sensing layer 40 will be described below with reference to FIGS. 4 and 5. Also, a cross-sectional structure of the touch sensing layer 40 will be described below in detail with reference to FIGS. 6 to 8.

The adhesive layer 50 may be formed on the touch sensing layer 40. The adhesive layer 50 may attach the second substrate 112 on the first substrate 111 on which the TFT layer 10, the light emitting device layer 20, the encapsulation layer 30, and the touch sensing layer 40 are provided. The adhesive layer 50 may be an optically clear resin (OCR) layer, an optically clear adhesive (OCA) film, or the like.

The second substrate 112 may act as a cover substrate or a cover window, which covers the first substrate 111. The second substrate 112 may be a plastic film, a glass substrate, an encapsulation film (a protective film), or the like.

Figure 4:
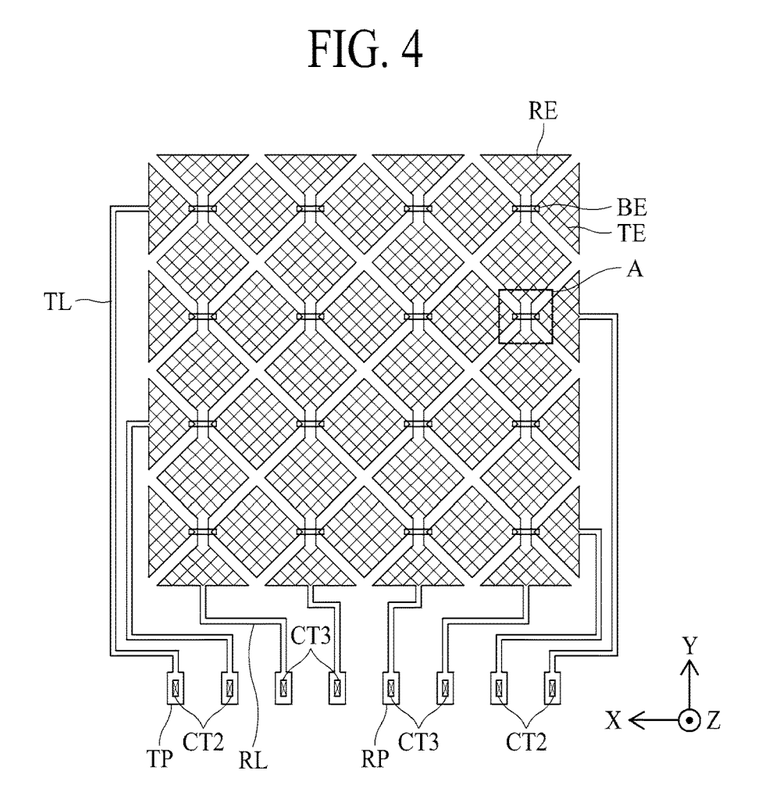
FIG. 4 is a plan view illustrating first touch electrodes, second touch electrodes, bridge electrodes, first touch lines, and second touch lines of a display apparatus with integrated touch screen according to an embodiment of the present disclosure.

FIG. 4 is a plan view illustrating first touch electrodes, second touch electrodes, bridge electrodes, first touch lines, and second touch lines of a display apparatus with integrated touch screen according to an embodiment of the present disclosure.

Referring to FIG. 4, a plurality of first touch electrodes TE may be arranged in a first direction (an X-axis direction), and a plurality of second touch electrodes RE may be arranged in a second direction (a Y-axis direction) transversing the first direction (the X-axis direction). In one embodiment, the first direction (the X-axis direction) may be a direction parallel to the scan lines SL1 to SLn, and the second direction (the Y-axis direction) may be a direction parallel to the data lines DL1 to DLm. In another embodiment, the first direction (the X-axis direction) may be a direction parallel to the data lines DL1 to DLm, and the second direction (the Y-axis direction) may be a direction parallel to the scan lines SL1 to SLn. However, the positional relationship between the first direction with the scan lines and the second direction with the data lines, or vice versa, does not necessarily have to be strictly parallel. In FIG. 4, an example where the first touch electrodes TE and the second touch electrodes RE having a diamond-shaped plane structure is illustrated, but the present embodiment is not limited thereto.

In order to prevent the first touch electrodes TE and the second touch electrodes RE from being short-circuited in intersection areas therebetween, the first touch electrodes TE which are adjacent to each other in the first direction (the X-axis direction) may be electrically connected to one another through a plurality of bridge electrodes BE. A mutual capacitance corresponding to a touch sensor may be generated in an intersection area of each of the first touch electrodes TE and a corresponding second touch electrode RE.

Moreover, each of first touch electrodes TE connected to each other in the first direction (the X-axis direction) may be spaced apart from and electrically insulated from first touch electrodes TE adjacent thereto in the second direction (the Y-axis direction). Each of second touch electrodes RE connected to each other in the second direction (the Y-axis direction) may be spaced apart from and electrically insulated from second touch electrodes RE adjacent thereto in the first direction (the X-axis direction).

A first touch electrode TE, disposed in one side end among first touch electrodes TE connected to each other in the first direction (the X-axis direction), may be connected to a first touch line TL. The first touch line TL may be connected to the first touch driver 181 through a first touch pad TP. Therefore, the first touch electrodes TE connected to each other in the first direction (the X-axis direction) may receive a touch driving signal from the first touch driver 181 through the first touch line TL.

A second touch electrode RE, disposed in one side end among second touch electrodes RE connected to each other in the second direction (the Y-axis direction), may be connected to a second touch line RL. The second touch line RL may be connected to the second touch driver 182 through a second touch pad RP. Therefore, the second touch driver 182 may receive charging variations of touch sensors of the second touch electrodes RE connected to each other in the second direction (the Y-axis direction).

Figure 5:
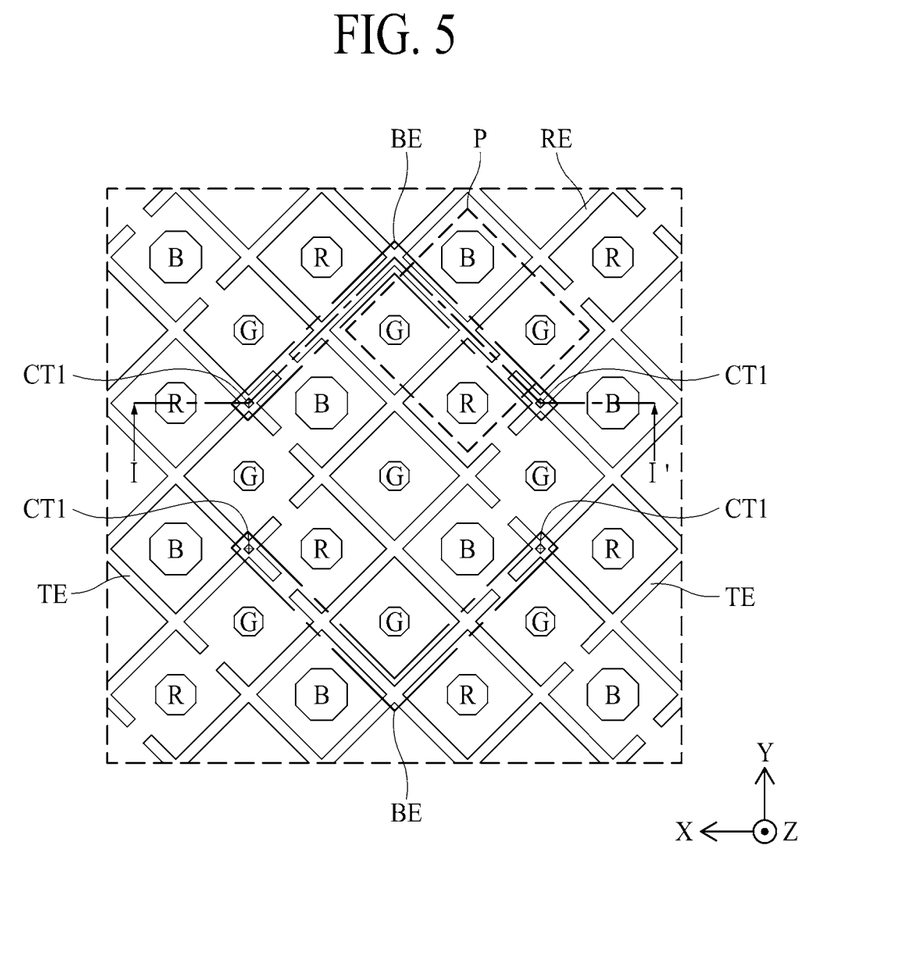
FIG. 5 is an enlarged view illustrating in detail an example of a region A of FIG. 4.

FIG. 5 is an enlarged view illustrating in detail an example of a region A of FIG. 4.

Referring to FIG. 5, a plurality of pixels P may be provided in a diagonal tile pattern structure. Each of the pixels P may include a plurality of subpixels SP, and for example, as in FIG. 5, may include one red pixel R, two green pixels G, and one blue pixel B. The red pixel R, the green pixels G, and the blue pixel B may be provided as an octagonal planar type. Also, among the size of the blue pixel B, the red pixel R, and the green pixels G, the blue pixel B may be the largest, and a size of each of the green pixels G may be the smallest. In FIG. 5, an example where the pixels P are provided in the diagonal tile pattern structure is illustrated, but the present embodiment is not limited thereto.

The first touch electrodes TE and the second touch electrodes RE may be provided in a mesh structure so as not to overlap the red pixel R, the green pixels G, and the blue pixel B of the pixels P. That is, the first touch electrodes TE and the second touch electrodes RE may be provided on a bank which is provided between the red pixel R, the green pixels G, and the blue pixel B.

First touch electrodes TE which are adjacent to each other in the first direction (the X-axis direction) may be electrically connected to each other through a plurality of bridge electrodes BE. The bridge electrodes BE may be respectively connected to first touch electrodes TE adjacent to each other through first contact holes CT1 exposing the first touch electrodes TE. Each of the bridge electrodes BE may overlap a corresponding first touch electrode TE and a corresponding second touch electrode RE. Each of the bridge electrodes BE may be provided on the bank which is provided between the red pixel R, the green pixels G, and the blue pixel B.

The first and second touch electrodes TE and RE may be disposed on the same layer, and the bridge electrodes BE may be disposed on a layer which differs from a layer on which the first and second touch electrodes TE and RE are disposed.

Figure 6:
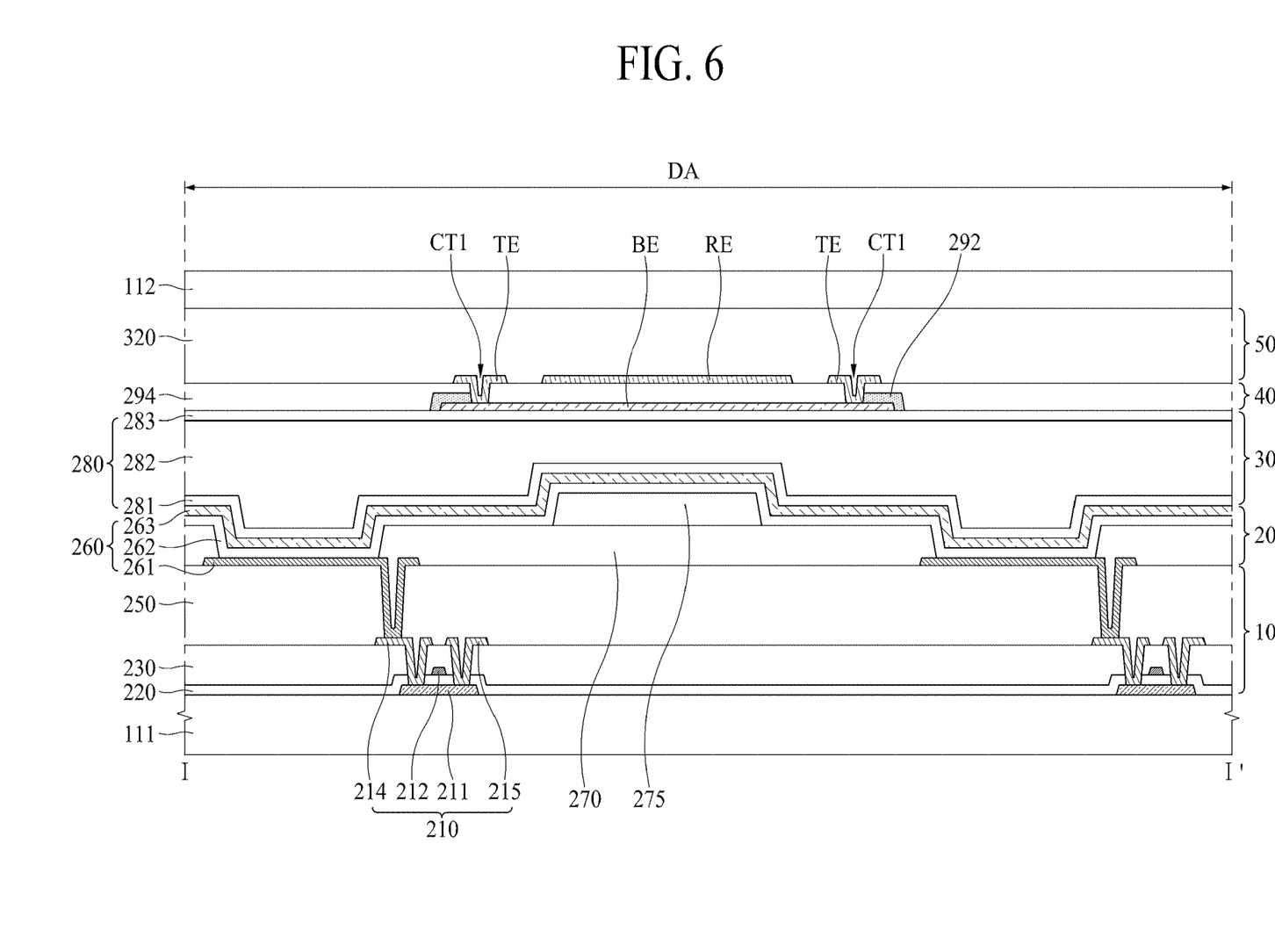
FIG. 6 is a cross-sectional view illustrating a first embodiment taken along line I-I' of FIG. 5.
Figure 7:
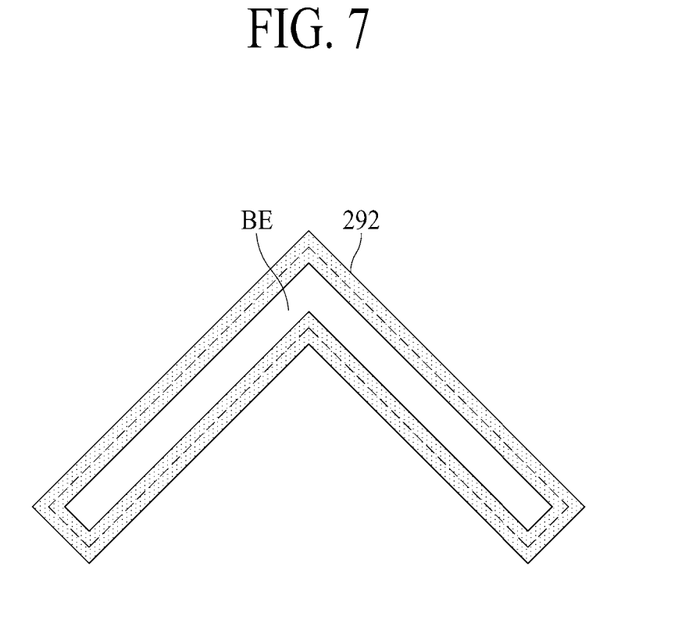
FIG. 7 is a plan view illustrating a first embodiment of a bridge electrode and a step height cover layer of FIG. 5.
Figure 8:
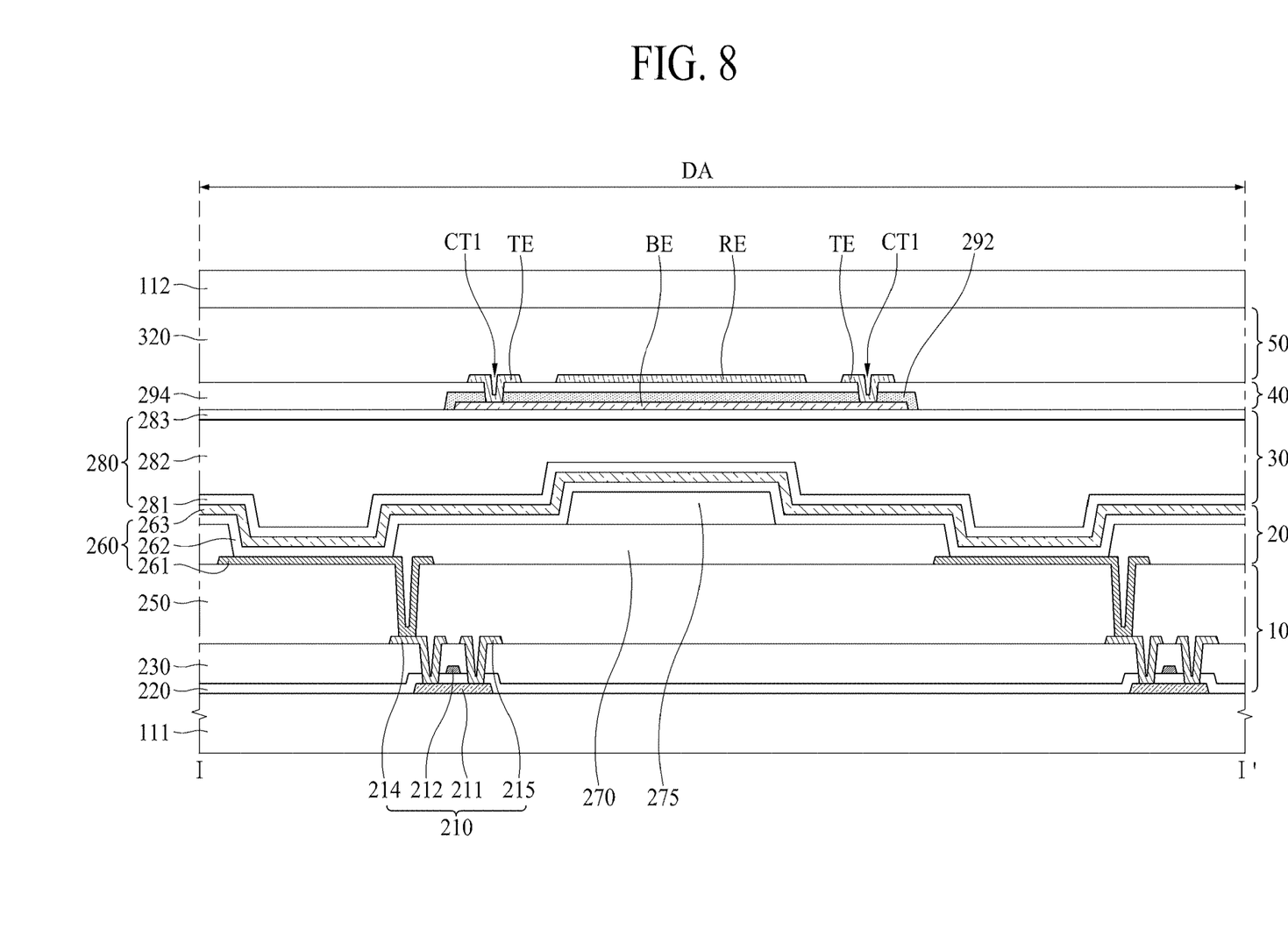
FIG. 8 is a cross-sectional view illustrating a second embodiment taken along line I-I' of FIG. 5.
Figure 9:
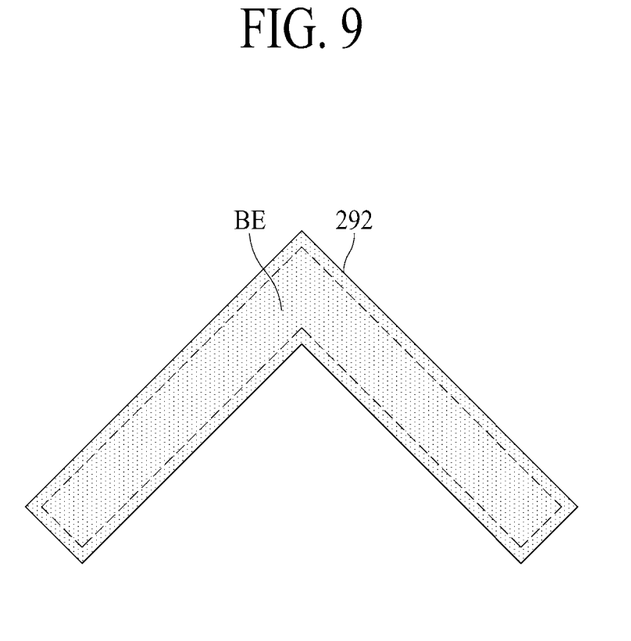
FIG. 9 is a plan view illustrating a second embodiment of a bridge electrode and a step height cover layer of FIG. 5.
Figure 10:
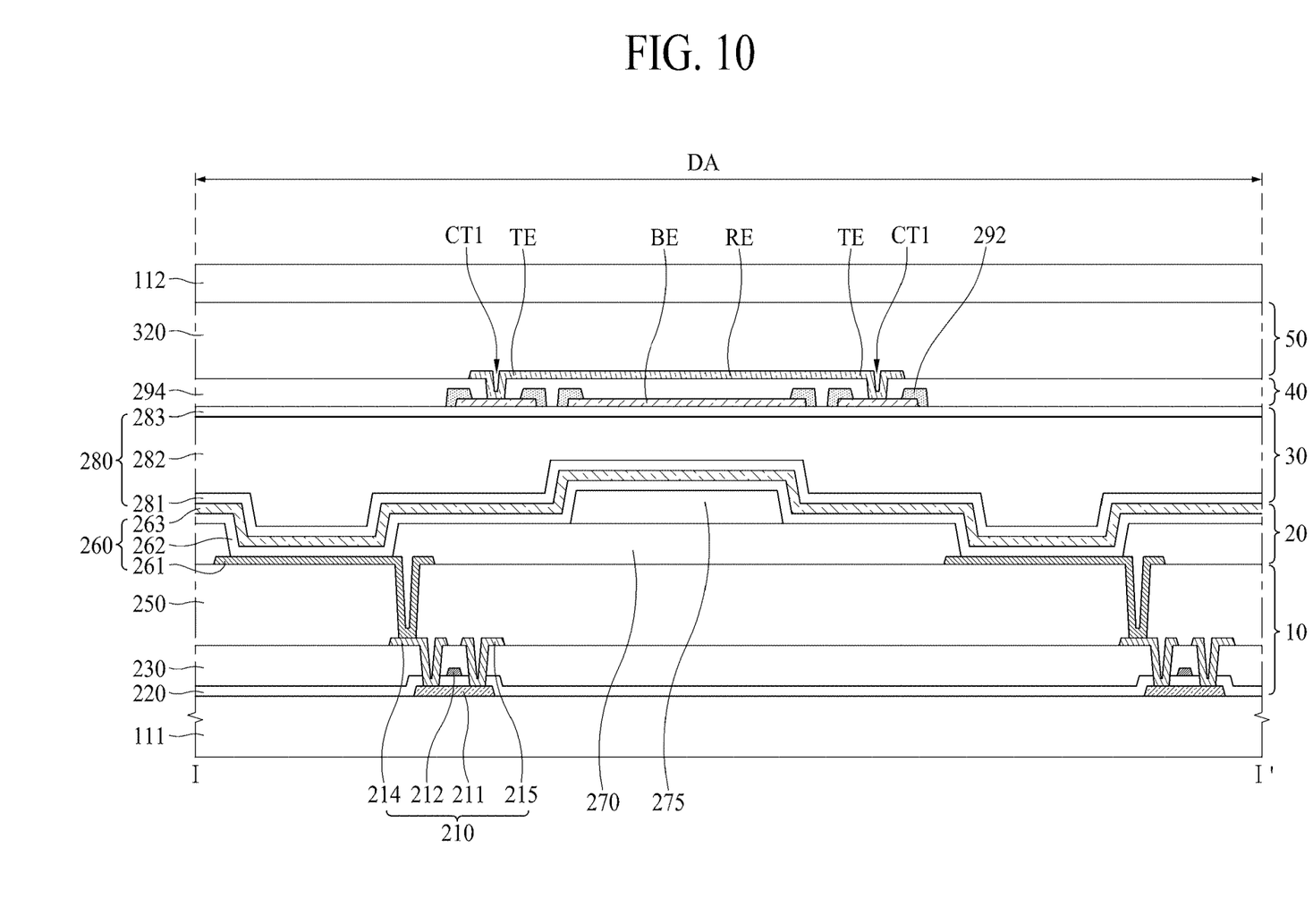
FIG. 10 is a cross-sectional view illustrating a third embodiment taken along line I-I' of FIG. 5.

FIG. 6 is a cross-sectional view illustrating a first embodiment taken along line I-I' of FIG. 5. FIG. 7 is a plan view illustrating a first embodiment of a bridge electrode and a step height cover layer of FIG. 5. FIG. 8 is a cross-sectional view illustrating a second embodiment taken along line I-I' of FIG. 5. FIG. 9 is a plan view illustrating a second embodiment of a bridge electrode and a step height cover layer of FIG. 5. FIG. 10 is a cross-sectional view illustrating a third embodiment taken along line I-I' of FIG. 5.

Referring to FIGS. 6 to 10, a TFT layer 10 may be formed on a first substrate 111. The TFT layer 10 may include a plurality of TFTs 210, first and second touch pads TP and RP (not shown), a gate insulation layer 220, an interlayer insulation layer 230, and a planarization layer 250.

A first buffer layer may be formed on one surface of the first substrate 111. The first buffer layer may be formed on the one surface of the first substrate 111, for protecting the TFTs 210 and a plurality of organic light emitting devices 260 from water penetrating through the first substrate 111 which is vulnerable to water. The one surface of the first substrate 111 may be a surface facing the second substrate 112. The first buffer layer may be formed of a plurality of inorganic layers which are alternately stacked. For example, the first buffer layer may be formed of a multilayer where one or more inorganic layers of silicon oxide (SiOx), silicon nitride (SiNx), and SiON are alternately stacked. The first buffer layer may be omitted.

The TFTs 210 may be formed on the first buffer layer. The TFTs 210 may each include an active layer 211, a gate electrode 212, a source electrode 214, and a drain electrode 215. In FIGS. 6, 8, and 10, the TFTs 210 are exemplarily illustrated as being formed as a top gate type where the gate electrode 212 is disposed on the active layer 211, but is not limited thereto. That is, the TFTs 210 may be formed as a bottom gate type where the gate electrode 212 is disposed under the active layer 211 or a double gate type where the gate electrode 212 is disposed both on and under the active layer 211.

The active layer 211 may be formed on the first buffer layer. The active layer 211 may be formed of a silicon-based semiconductor material, an oxide-based semiconductor material, and/or the like. A light blocking layer (not shown) for blocking external light incident on the active layer 211 may be formed between the first buffer layer and the active layer 211.

The gate insulation layer 220 may be formed on the active layer 211. The gate insulation layer 220 may be formed of an inorganic layer, and for example, may be formed of SiOx, SiNx, or a multilayer thereof.

The gate electrode 212 and a gate line may be formed on the gate insulation layer 220. The gate electrode 212 and the gate line may each be formed of a single layer or a multilayer which includes one of molybdenum (Mo), aluminum (Al), chromium (Cr), gold (Au), titanium (Ti), nickel (Ni), neodymium (Nd), and copper (Cu), or an alloy thereof.

The interlayer insulation layer 230 may be formed on the gate electrode 212 and the gate line. The interlayer insulation layer 230 may be formed of an inorganic layer, and for example, may be formed of SiOx, SiNx, or a multilayer thereof.

The source electrode 214, the drain electrode 215, a data line, a power line, and first and second touch pads TP and RP may be formed on the interlayer insulation layer 230. Each of the source electrode 214 and the drain electrode 215 may be connected to the active layer 211 through a contact hole which passes through the gate insulation layer 220 and the interlayer insulation layer 230. The source electrode 214, the drain electrode 215, the data line, the power line, and the first and second touch pads TP and RP may each be formed of a single layer or a multilayer which includes one of Mo, Al, Cr, Au, Ti, Ni, Nd, and Cu, or an alloy thereof.

A passivation layer for insulating the TFTs 210 may be formed on the source electrode 214, the drain electrode 214, the data line, and the power line. The passivation layer may be formed of an inorganic layer, and for example, may be formed of SiOx, SiNx, or a multilayer thereof. The passivation layer may be omitted.

The planarization layer 250 for planarizing a step height caused by the TFTs 210 may be formed on the passivation layer. The planarization layer 250 may be formed of an organic layer such as acryl resin, epoxy resin, phenolic resin, polyamide resin, polyimide resin, or the like.

The light emitting device layer 20 may be formed on the TFT layer 10. The light emitting device layer 20 may include a plurality of light emitting devices 260, a bank 270, and a spacer 275.

The light emitting devices 260, the bank 270, and the spacer 275 may be formed on the planarization layer 250. The light emitting devices 260 may each include a first electrode 261, an organic light emitting layer 262, and a second electrode 263. The first electrode 261 may be an anode electrode, and the second electrode 263 may be a cathode electrode.

The first electrode 261 may be formed on the planarization layer 250. The first electrode 261 may be connected to the source electrode 214 of the TFT 210 through a contact hole which passes through the passivation layer 240 and the planarization layer 250. The first electrode 261 may be formed of a metal material, which is high in reflectivity, such as a stacked structure (Ti/Al/Ti) of Al and Ti, a stacked structure (ITO/Al/ITO) of Al and ITO, an APC alloy, or a stacked structure (ITO/APC/ITO) of an APC alloy and ITO. The APC alloy may be an alloy of Ag, palladium (Pd), and Cu.

The bank 270 may be formed on the planarization layer 250 to divide the first electrode 261, for acting as a pixel forming layer which forms a plurality of subpixels SP. The bank 270 may be formed to cover an edge of the first electrode 261. The bank 270 may be formed of an organic layer such as acryl resin, epoxy resin, phenolic resin, polyamide resin, polyimide resin, or the like.

The spacer 275 may be formed on the bank 270. The spacer 275 may be formed of an organic layer such as acryl resin, epoxy resin, phenolic resin, polyamide resin, polyimide resin, or the like. The spacer 285 may be omitted.

Each of the subpixels SP may denote an area where the first electrode 261 corresponding to an anode electrode, the light emitting layer 262, and the second electrode 263 corresponding to a cathode electrode are sequentially stacked, and a hole from the first electrode 261 and an electron from the second electrode 263 are combined with each other in the light emitting layer 262 to emit light.

The light emitting layer 262 may be formed on the first electrode 261, the bank 270, and the spacer 275. The light emitting layer 262 may be an organic light emitting layer which includes an organic material and emits light having a certain color. In a case where the light emitting layer 262 is a white light emitting layer emitting white light, the light emitting layer 262 may be a common layer which is formed in the pixels P in common. In this case, the light emitting layer 262 may be formed in a tandem structure including two or more stacks. Each of the stacks may include a hole transporting layer, at least one light emitting layer, and an electron transporting layer.

Moreover, a charge generating layer may be formed between the stacks. The charge generating layer may include an n-type charge generating layer, disposed adjacent to a lower stack, and a p-type charge generating layer which is formed on the n-type charge generating layer and is disposed adjacent to an upper stack. The n-type charge generating layer may inject an electron into the lower stack, and the p-type charge generating layer may inject a hole into the upper stack. The n-type charge generating layer may be formed of an organic layer where alkali metal, such as lithium (Li), sodium (Na), potassium (K), or cesium (Cs), or alkali earth metal such as magnesium (Mg), strontium (Sr), barium (Ba), or radium (Ra) is doped on an organic host material having an ability to transport electrons. The p-type charge generating layer may be an organic layer where a dopant is doped on an organic material having an ability to transport holes.

The second electrode 263 may be formed on the light emitting layer 262. The second electrode 263 may be formed to cover the light emitting layer 262. The second electrode 263 may be a common layer which is formed in the plurality of pixels P in common.

The second electrode 263 may be formed of a transparent conductive material (or TCO), such as indium tin oxide (ITO) or indium zinc oxide (IZO) capable of transmitting light, or a semi-transmissive conductive material such as Mg, Ag, or an alloy of Mg and Ag. If the second electrode 263 is formed of a semi-transmissive conductive material, emission efficiency is enhanced by a micro-cavity. A capping layer may be formed on the second electrode 263.

The encapsulation layer 30 may be formed on the light emitting device layer 260. The encapsulation layer 30 may include an encapsulation film 280.

The encapsulation film 280 may be formed on the second electrode 263. The encapsulation film 280 may include at least one inorganic layer and at least one organic layer, for preventing oxygen or water from penetrating into the light emitting layer 262 and the second electrode 263. For example, the encapsulation film 280 may include first and second inorganic layers 281 and 283 and an organic layer 282 disposed between the first and second inorganic layers 281 and 283. Each of the first and second inorganic layers 281 and 283 may be formed of silicon nitride, aluminum nitride, zirconium nitride, titanium nitride, hafnium nitride, tantalum nitride, silicon oxide, aluminum oxide, titanium oxide, and/or the like. The organic layer 282 may be formed to have a sufficient thickness (for example, a thickness of about 7 μm to 8 μm), for preventing particles from penetrating into the light emitting layer 262 and the second electrode 263 via the encapsulation film 280.

A touch sensing layer 40 may be formed on the encapsulation layer 30. The touch sensing layer 40 may include a plurality of first touch electrodes TE, a plurality of second touch electrodes RE, a plurality of bridge electrodes BE, a step height cover layer 292, and a touch insulation layer 294.

The first and second touch electrodes TE and RE may be disposed on the same layer. The first and second touch electrodes TE and RE may be spaced apart and electrically insulated from each other.

In detail, the bridge electrodes BE may be formed on the encapsulation layer 30. The bridge electrodes BE may each be formed of a single layer or a multilayer which includes one of Mo, Al, Cr, Au, Ti, Ni, Nd, and Cu, or an alloy thereof.

In FIGS. 6 and 8, it is illustrated that the bridge electrodes BE are directly provided on the second inorganic layer 283 configuring the encapsulation film 280, but the present embodiment is not limited thereto. In other embodiments, a second buffer layer may be separately provided between the second inorganic layer 283 of the encapsulation film 280 and the bridge electrodes BE. The second buffer layer may be provided to cover the encapsulation film 280 and the first and second touch pads TP and RP. The second buffer layer may be formed of an inorganic layer or an organic layer. In a case where the second buffer layer is formed of an inorganic layer, the second buffer layer may be formed of SiOx, SiNx, or a multilayer thereof. In a case where the second buffer layer is formed of an organic layer, a surface roughness of the second buffer layer is roughened by performing plasma treatment on the second buffer layer. In this case, an area of the second buffer layer contacting the bridge electrodes BE increases, and thus, an interface adhesive force between the second buffer layer and the bridge electrodes BE increases.

The step height cover layer 292 may be formed on the bridge electrodes BE. The step height cover layer 292 may be provided to cover a step height caused by the bridge electrodes BE. An area where the step height cover layer 292 is provided may vary based on a process of forming a first contact hole CT1.

In an embodiment, when the touch insulation layer 294 disposed on the step height cover layer 292 may be formed by using a mask and thus the first contact hole CT1 is formed, the step height cover layer 292 may be formed to cover a step height occurring in an edge of each of the bridge electrodes BE along the edge of each of the bridge electrodes BE as in FIGS. 6 and 7. In this case, the first contact hole CT1 may pass through the touch insulation layer 294 and may expose a portion of each of the bridge electrodes BE.

In other embodiments, as in FIGS. 8 and 9, when the touch insulation layer 294 is formed on the step height cover layer 292 and the first contact hole CT1 is formed through etching, the step height cover layer 292 may be formed to cover the bridge electrodes BE and the step height occurring in the edge of each of the bridge electrodes BE, except an area where the first contact hole CT1 is formed. In this case, the first contact hole CT1 may pass through the step height cover layer 292 and the touch insulation layer 294 and may expose a portion of each of the bridge electrodes BE.

The step height cover layer 292 may be formed of an organic layer. The step height cover layer 292 may be formed of an organic layer such as acryl resin, epoxy resin, phenolic resin, polyamide resin, polyimide resin, or the like.

Since an interface adhesive force between an inorganic layer and an inorganic layer is higher than an interface adhesive force between an organic layer and an inorganic layer, the step height cover layer 292 may be pattern-formed on the bridge electrodes BE as described above. In a case where the step height cover layer 292 is widely formed on a second inorganic layer 283 of the encapsulation film 280, since an interface adhesive force between the step height cover layer 292 and the second inorganic layer 283 of the encapsulation film 280 is weak, the partial detachment of an organic layer where the step height cover layer 292 is partially detached occurs.

In order to solve such a problem, the step height cover layer 292 according to an embodiment of the present disclosure may be pattern-formed in a portion or a whole portion of the bridge electrode BE as in FIGS. 6 to 9.

The touch insulation layer 294 may be formed on the step height cover layer 292. The touch insulation layer 294 may be disposed on the bridge electrodes BE and may insulate the bridge electrodes BE from the second touch electrodes RE. Also, the touch insulation layer 294 may be formed between the bridge electrodes BE and may insulate the bridge electrodes BE. The touch insulation layer 294 may be formed of an inorganic layer, and for example, may be formed of SiOx, SiNx, or a multilayer thereof.

The first touch electrodes TE and the second touch electrodes RE may be formed on the touch insulation layer 294. The first touch electrodes TE may be connected to the bridge electrode BE through the first contact hole CT1. For example, as in FIG. 6, the first touch electrodes TE may be connected to the bridge electrode BE through the first contact hole CT1 which passes through the touch insulation layer 294 and exposes the bridge electrode BE. As another example, as in FIG. 8, the first touch electrodes TE may be connected to the bridge electrode BE through the first contact hole CT1 which passes through the touch insulation layer 294 and the step height cover layer 292 and exposes the bridge electrode BE. Therefore, the first touch electrodes TE may be connected to each other by using the bridge electrodes BE in intersection areas of the first touch electrodes TE and the second touch electrodes RE, and thus, the first touch electrodes TE and the second touch electrodes RE are not short-circuited with one another. Also, the first touch electrodes TE and the second touch electrodes RE may be disposed to overlap the bank 270 so as to prevent an opening area of each subpixel SP from being reduced.

A first touch line TL may extend from the first touch electrode TE, and a second touch line RL may extend from the second touch electrode RE. The first touch line TL may be connected to a first touch pad TP through a second contact hole CT2 which passes through the first and second inorganic layers 281 and 283 of the encapsulation film 280 and the touch insulation layer 294.

The second touch line RL may be connected to a second touch pad RP through a third contact hole CT3 which passes through the first and second inorganic layers 281 and 283 of the encapsulation film 280 and the touch insulation layer 294.

The first touch electrodes TE, the second touch electrodes RE, the first touch lines TL, and the second touch lines RL may each be formed of a single layer or a multilayer which includes one of Mo, Al, Cr, Au, Ti, Ni, Nd, and Cu, or an alloy thereof.

In FIGS. 6 to 9, an example where the bridge electrode BE are provided on the encapsulation film 280, the touch insulation layer 294 is provided on the bridge electrodes BE, and the first touch electrodes TE and the second touch electrodes RE are provided on the touch insulation layer 294 is illustrated, but the present embodiment is not limited thereto.

In other embodiments, as in FIG. 10, the first touch electrodes TE and the second touch electrodes RE may be provided on the encapsulation film 280, the touch insulation layer 294 may be provided on the first touch electrodes TE and the second touch electrodes RE, and the bridge electrode BE may be provided on the touch insulation layer 294.

In more detail, the first and second touch electrodes TE and RE may be disposed on the same layer. The first and second touch electrodes TE and RE may be spaced apart and electrically insulated from each other.

In detail, the first touch electrodes TE and the second touch electrodes RE may be formed on the encapsulation layer 30. The first touch electrodes TE may be connected to the bridge electrode BE through the first contact hole CT1. Therefore, the first touch electrodes TE may be connected to each other by using the bridge electrodes BE in overlapping areas of the first touch electrodes TE and the second touch electrodes RE, and thus, the first touch electrodes TE and the second touch electrodes RE are not short-circuited with one another. Also, the first touch electrodes TE and the second touch electrodes RE may be disposed to overlap the bank 270 so as to prevent an opening area of each subpixel SP from being reduced.

The first touch line TL may extend from the first touch electrode TE, and the second touch line RL may extend from the second touch electrode RE. The first touch line TL may be connected to the first touch pad TP through the second contact hole CT2 which passes through the first and second inorganic layers 281 and 283 of the encapsulation film 280.

The second touch line RL may extend from the second touch electrode RE and may be connected to the second touch pad RP through the third contact hole CT3 which passes through the first and second inorganic layers 281 and 283 of the encapsulation film 280.

The first touch electrodes TE, the second touch electrodes RE, the first touch lines TL, and the second touch lines RL may each be formed of a single layer or a multilayer which includes one of Mo, Al, Cr, Au, Ti, Ni, Nd, and Cu, or an alloy thereof.

In FIG. 10, it is illustrated that the first touch electrodes TE and the second touch electrodes RE are directly provided on the second inorganic layer 283 configuring the encapsulation film 280, but the present embodiment is not limited thereto. In other embodiments, a second buffer layer may be separately provided between the second inorganic layer 283 of the encapsulation film 280 and the first and second touch electrodes TE and RE. The second buffer layer may be provided to cover the encapsulation film 280 and the first and second touch pads TP and RP. The second buffer layer may be formed of an inorganic layer or an organic layer. In a case where the second buffer layer is formed of an inorganic layer, the second buffer layer may be formed of SiOx, SiNx, or a multilayer thereof. In a case where the second buffer layer is formed of an organic layer, a surface roughness of the second buffer layer is roughened by performing plasma treatment on the second buffer layer. In this case, an area of the second buffer layer contacting the first and second touch electrodes TE and RE increases, and thus, an interface adhesive force between the second buffer layer and the first and second touch electrodes TE and RE increases.

The step height cover layer 292 may be formed on the first touch electrodes TE and the second touch electrodes RE. The step height cover layer 292 may be provided to cover a step height caused by the first touch electrodes TE and the second touch electrodes RE. An area where the step height cover layer 292 is provided may vary based on a process of forming the first contact hole CT1.

In an embodiment, when the touch insulation layer 294 disposed on the step height cover layer 292 may be formed by using a mask and thus the first contact hole CT1 is formed, the step height cover layer 292 may be formed to cover a step height occurring in an edge of each of the first and second touch electrodes TE and RE along the edge of each of the first and second touch electrodes TE and RE as in FIG. 10. In this case, the first contact hole CT1 may pass through the touch insulation layer 294 and may expose a portion of each of the bridge electrodes BE.

In other embodiments, when the touch insulation layer 294 is formed on the step height cover layer 292 and the first contact hole CT1 is formed through etching, the step height cover layer 292 may be formed to cover the first and second touch electrodes TE and RE and the step height occurring in the edge of each of the first and second touch electrodes TE and RE, except an area where the first contact hole CT1 is formed. In this case, the first contact hole CT1 may pass through the step height cover layer 292 and the touch insulation layer 294 and may expose a portion of each of the bridge electrodes BE. In other embodiments, first touch electrodes TE and second touch electrodes RE are disposed on the encapsulation layer 30. The step height cover layer 292 is disposed on the first touch electrodes TE and the second touch electrodes RE, and the bridge electrodes BE are disposed on the step height cover layer 292.

The step height cover layer 292 may be formed of an organic layer. The step height cover layer 292 may be formed of an organic layer such as acryl resin, epoxy resin, phenolic resin, polyamide resin, polyimide resin, or the like.

Since an interface adhesive force between an inorganic layer and an inorganic layer is higher than an interface adhesive force between an organic layer and an inorganic layer, the step height cover layer 292 may be pattern-formed on the bridge electrodes BE as described above. In a case where the step height cover layer 292 is widely formed on the second inorganic layer 283 of the encapsulation film 280, since an interface adhesive force between the step height cover layer 292 and the second inorganic layer 283 of the encapsulation film 280 is weak, the partial detachment of an organic layer where the step height cover layer 292 is partially detached occurs.

In order to solve such a problem, the step height cover layer 292 according to an embodiment of the present disclosure may be pattern-formed in a portion or a whole portion of the first and second touch electrodes TE and RE.

The touch insulation layer 294 may be formed on the step height cover layer 292. The touch insulation layer 294 may be disposed on the first and second touch electrodes TE and RE and may insulate the bridge electrodes BE from the first and second touch electrodes TE and RE. Also, the touch insulation layer 294 may be formed between the first and second touch electrodes TE and RE and may insulate the first and second touch electrodes TE and RE. The touch insulation layer 294 may be formed of an inorganic layer, and for example, may be formed of SiOx, SiNx, or a multilayer thereof.

The bridge electrodes BE may be formed on the touch insulation layer 294. The bridge electrodes BE may be connected to the first touch electrodes TE through the first contact hole CT1. For example, the bridge electrodes BE may be connected to the first touch electrodes TE through the first contact hole CT1 which passes through the touch insulation layer 294 and exposes the first touch electrodes TE. As another example, the bridge electrodes BE may be connected to the first touch electrodes TE through the first contact hole CT1 which passes through the touch insulation layer 294 and the step height cover layer 292 and exposes the first touch electrodes TE.

The bridge electrodes BE may each be formed of a single layer or a multilayer which includes one of Mo, Al, Cr, Au, Ti, Ni, Nd, and Cu, or an alloy thereof.

A color filter layer may be formed on the touch sensing layer 40. The color filter layer may include a plurality of color filters, disposed to overlap subpixels SP, and a black matrix disposed to overlap the bank 270. In a case where the light emitting layer 262 includes a plurality of organic light emitting layers which emit red, green, and blue lights, the color filter layer may be omitted.

An adhesive layer 50 may be formed on the touch sensing layer 40. The adhesive layer 50 may attach the second substrate 112 on the first substrate 111 on which the TFT layer 10, the light emitting device layer 20, the encapsulation layer 30, and the touch sensing layer 40 are provided. The adhesive layer 50 may be an OCR layer, an OCA film, or the like.

The second substrate 112 may act as a cover substrate or a cover window, which covers the first substrate 111. The second substrate 112 may be a plastic film, a glass substrate, an encapsulation film (a protective film), or the like.

In the display apparatus with integrated touch screen according to an embodiment of the present disclosure, since the step height cover layer 292 for covering a step height caused by an electrode provided on the encapsulation layer 280 is provided, a step height is reduced. Accordingly, in the display apparatus with integrated touch screen according to an embodiment of the present disclosure, a void is prevented from occurring due to a step height when forming the touch insulation layer 294.

Moreover, the display apparatus with integrated touch screen according to an embodiment of the present disclosure, the step height cover layer 292 including an organic material may be pattern-formed on the electrode provided on the encapsulation film 280, thereby minimizing the partial detachment of an organic layer caused by the step height cover layer 292.

As described above, according to the embodiments of the present disclosure, since the touch sensing layer is directly provided on the encapsulation layer and the color filter layer is directly provided on the touch sensing layer, alignment is not needed in a process of bonding the first substrate to the second substrate, and a separate adhesive layer is not needed.

Moreover, according to the embodiments of the present disclosure, since the step height cover layer for covering a step height caused by the electrode provided on the encapsulation layer is provided, a step height is reduced. Accordingly, in the display apparatus with integrated touch screen according to the embodiments of the present disclosure, a void is prevented from occurring due to a step height when forming the touch insulation layer.

Moreover, according to the embodiments of the present disclosure, short circuit is prevented from occurring between the bridge electrodes and the first and second touch electrodes.

Moreover, according to the embodiments of the present disclosure, the step height cover layer including an organic material may be pattern-formed on the electrode provided on the encapsulation layer, thereby minimizing the partial detachment of an organic layer caused by the step height cover layer.

It will be apparent to those skilled in the art that various modifications and variations can be made in the present disclosure without departing from the spirit or scope of the disclosures. Thus, it is intended that the present disclosure covers the modifications and variations of this disclosure provided they come within the scope of the appended claims and their equivalents.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A display apparatus with integrated touch screen, the display apparatus comprising:
    a light emitting device layer;
    an encapsulation layer on the light emitting device layer and including at least one inorganic layer and at least one organic layer; and
    a touch sensing layer on the encapsulation layer, the touch sensing layer including:
        a plurality of first touch electrodes;
        a plurality of second touch electrodes;
        a plurality of bridge electrodes disposed on the encapsulation layer; and
        a step height cover layer covering a step height caused by the plurality of bridge electrodes, and wherein the step height cover layer is disposed on the plurality of bridge electrodes; and
        a touch insulation layer disposed on the plurality of bridge electrodes and the step height cover layer,
    wherein the plurality of first touch electrodes and the plurality of second touch electrodes are disposed on the touch insulation layer,
    wherein the touch insulation layer is disposed between the step height cover layer and the plurality of first touch electrodes and second touch electrodes, and the step height cover layer is disposed between the plurality of bridge electrodes and the touch insulation layer, and
    wherein the step height cover layer, disposed between the plurality of bridge electrodes and the touch insulation layer, is in direct contact with an upper surface and a lateral surface of the plurality of bridge electrodes to cover the edge region.

2. The display apparatus of claim 1, wherein the step height cover layer is provided to cover each of the plurality of bridge electrodes.

3. The display apparatus of claim 2, wherein
    the plurality of first touch electrodes are connected to the plurality of bridge electrodes through a plurality of first contact holes which pass through the touch insulation layer and the step height cover layer and expose the plurality of bridge electrodes.

4. The display apparatus of claim 1, wherein
    the plurality of first touch electrodes are connected to the plurality of bridge electrodes through a plurality of first contact holes which pass through the touch insulation layer and expose the plurality of bridge electrodes.

5. The display apparatus of claim 1, wherein the step height cover layer comprises an organic material.

6. A display apparatus with integrated touch screen, the display apparatus comprising:
    a light emitting device layer;
    a touch sensing layer on the light emitting device layer, the touch sensing layer including:
        a first plurality of touch electrodes;
        a second plurality of touch electrodes;
        a plurality of bridge electrodes connected to the first plurality of touch electrodes through a contact hole;
        a step height cover layer between the first plurality of touch electrodes and the plurality of bridge electrodes; and
        a touch insulation layer between the first plurality of touch electrodes and the plurality of bridge electrodes, wherein the touch insulation layer is disposed on the step height cover layer, wherein the contact hole passes through the touch insulation layer, and wherein the step height cover layer is disposed between the plurality of bridge electrodes and the touch insulation layer, and the step height cover layer, disposed between the plurality of bridge electrodes and the touch insulation layer, covers an upper surface and a lateral surface of the plurality of bridge electrodes to cover an edge portion of the plurality of bridge electrodes.

7. The display apparatus of claim 6, wherein the step height cover layer is on the plurality of bridge electrodes.

8. The display apparatus of claim 6, wherein the first plurality of touch electrodes and the second plurality of touch electrodes are on the touch insulation layer, the plurality of bridge electrodes on a different layer of the touch sensing layer from the touch insulation layer, the first plurality of touch electrodes and the second plurality of touch electrodes spaced apart and electrically insulated from each other.

9. The display apparatus of claim 6, wherein the step height cover layer covering a portion of the plurality of bridge electrodes and a portion of the first plurality of touch electrodes adjacent to the contact hole formed by extending the first plurality of touch electrodes.

10. The display apparatus of claim 6, wherein the step height cover layer covering the plurality of bridge electrodes.

11. The display apparatus of claim 6, wherein the plurality of bridge electrodes are spaced apart from each other, the step height cover layer covering an edge of the spaced apart bridge electrodes.

12. The display apparatus of claim 6, wherein the plurality of bridge electrodes are spaced apart from each other, the step height cover layer covering a portion of the spaced apart bridge electrodes and the step height cover layer being spaced apart from the contact hole.

* * * * *